Patented Feb. 13, 1934

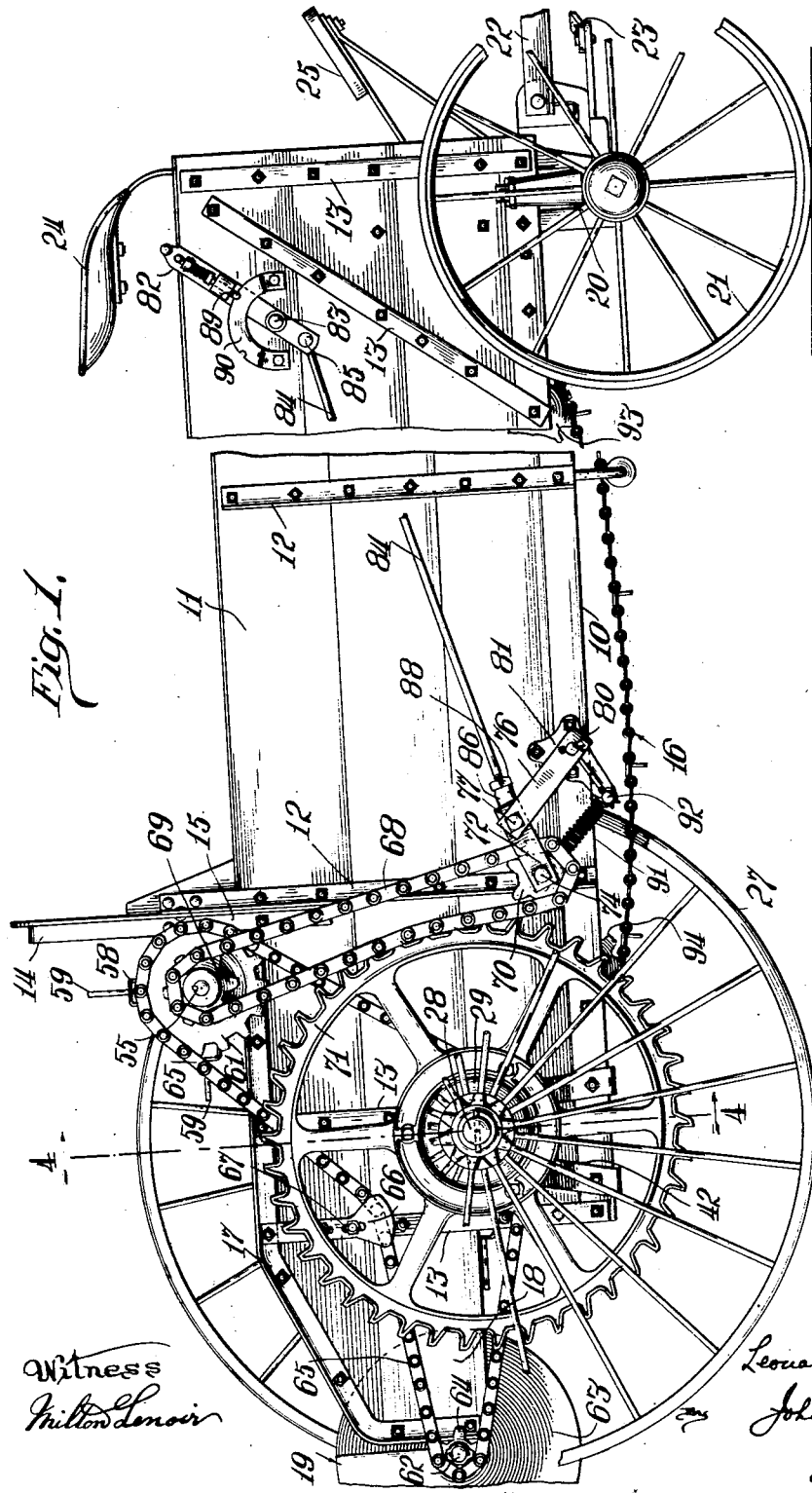

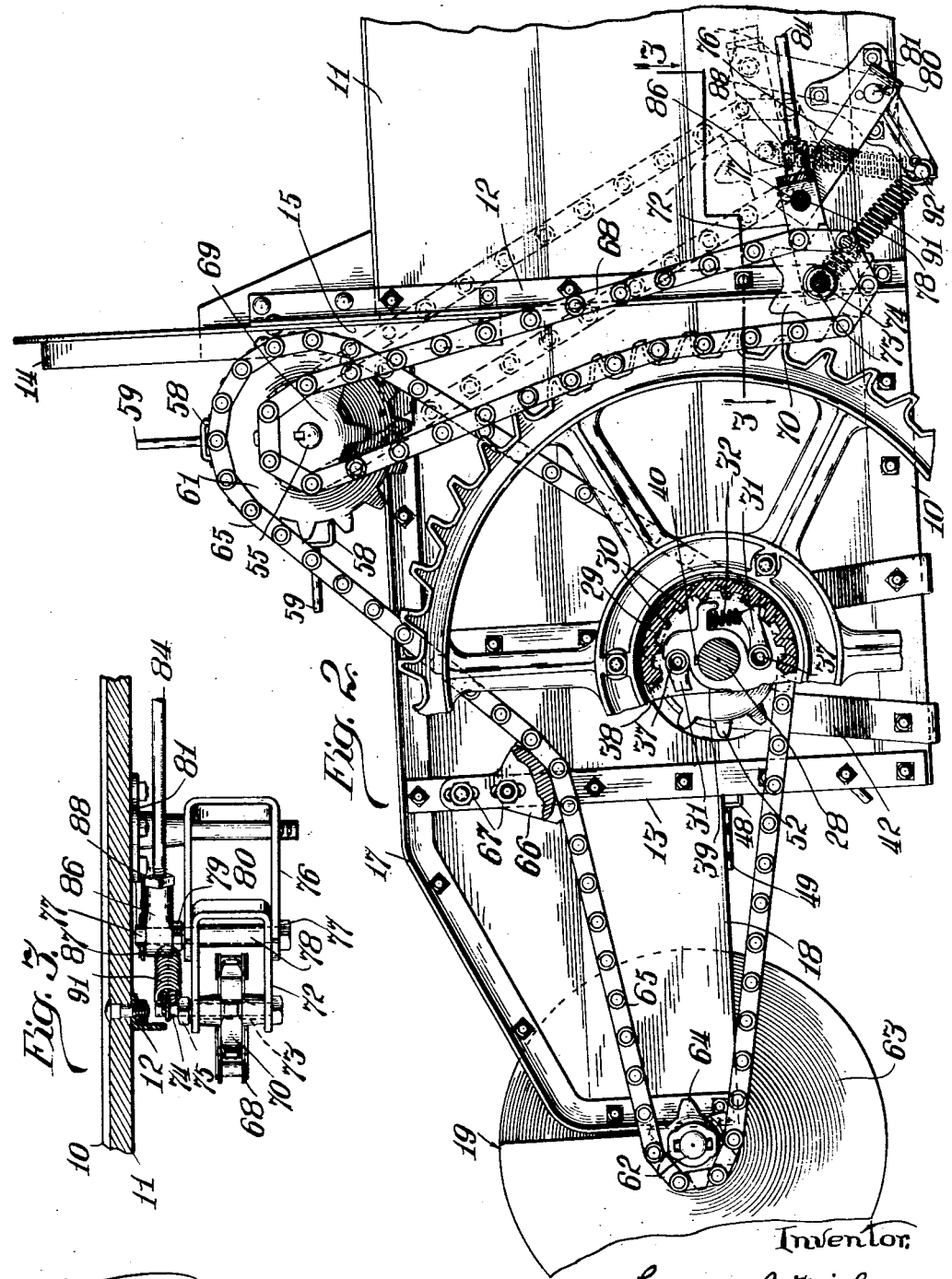

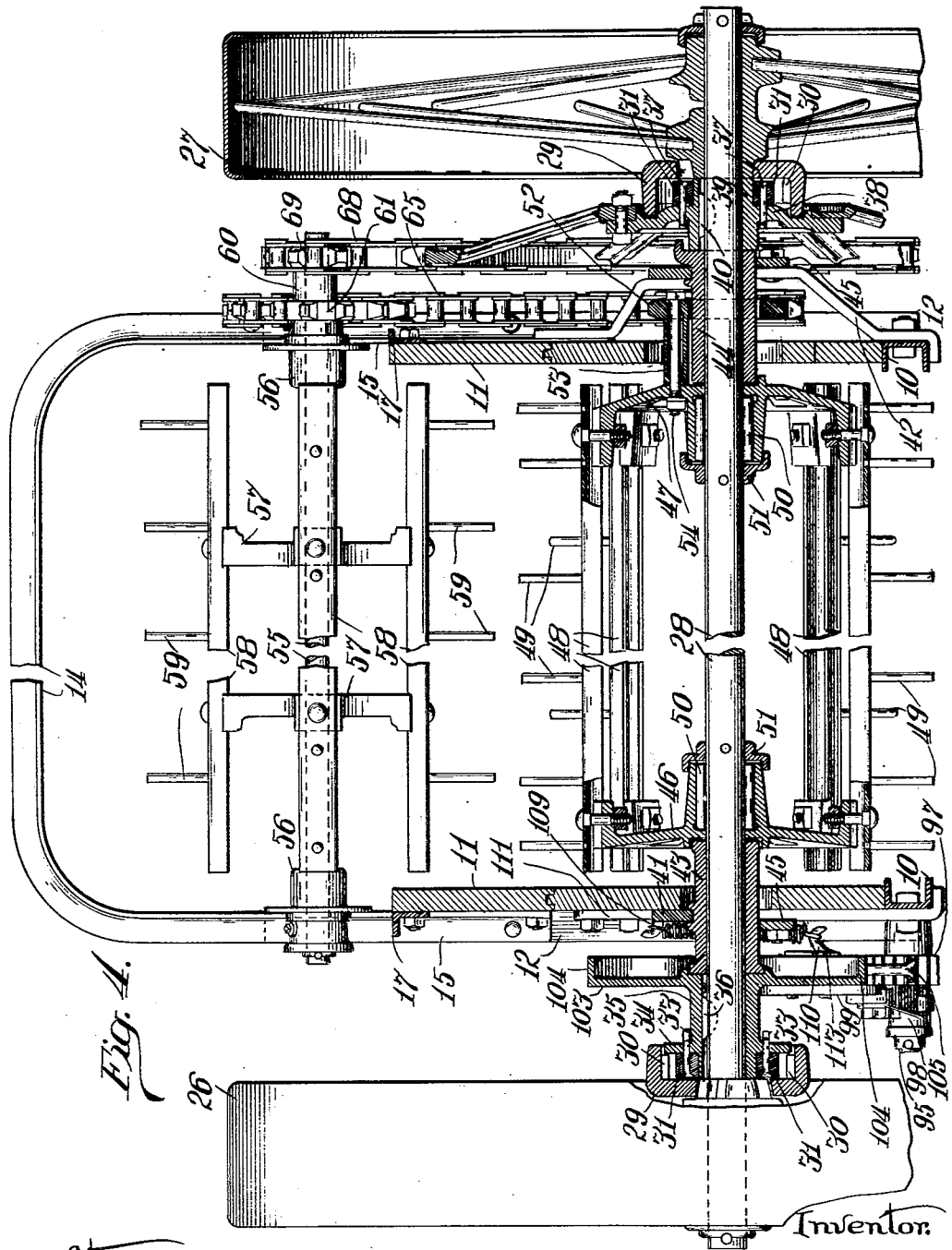

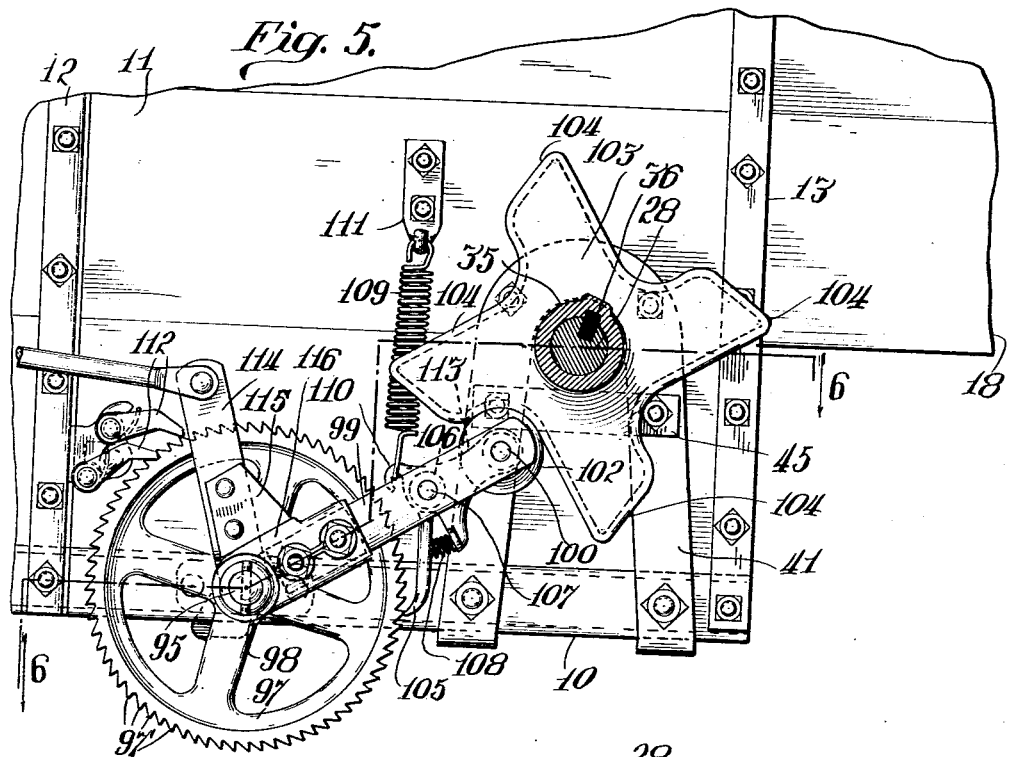
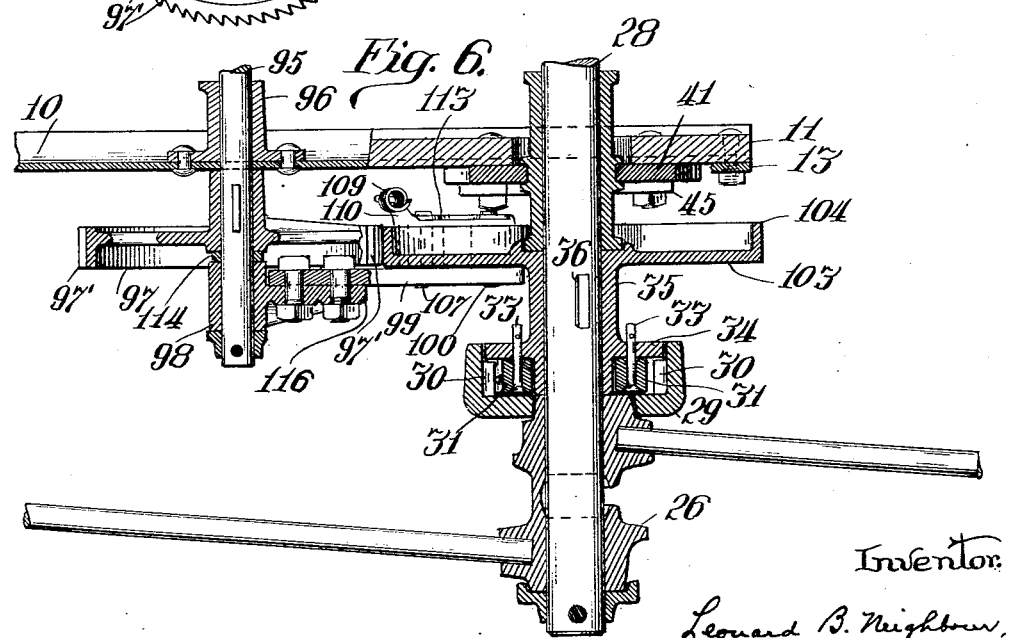

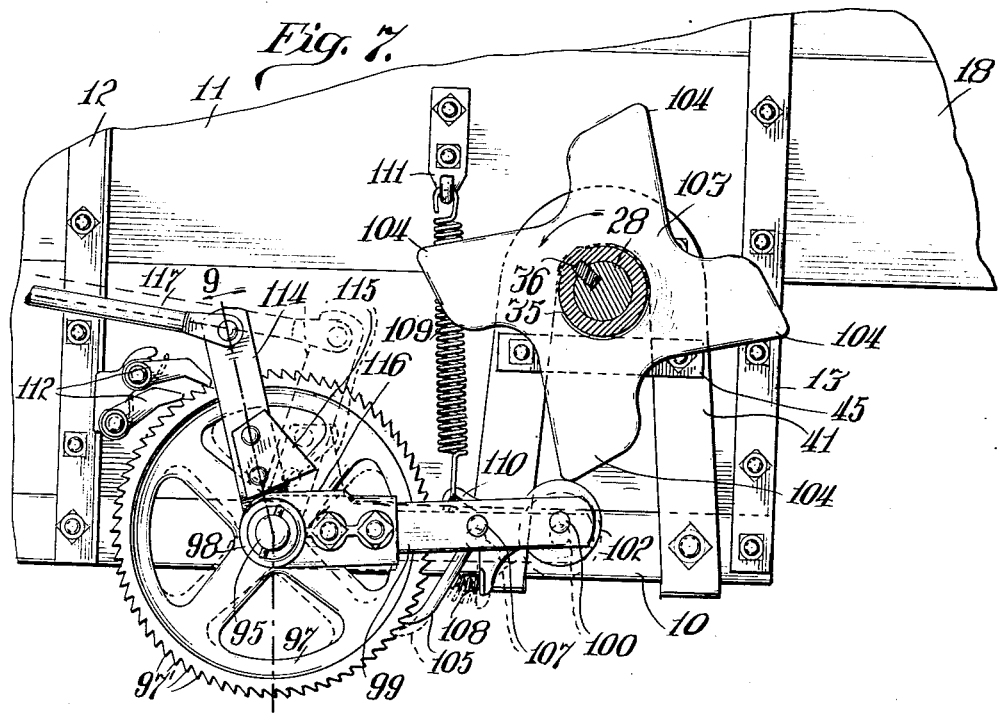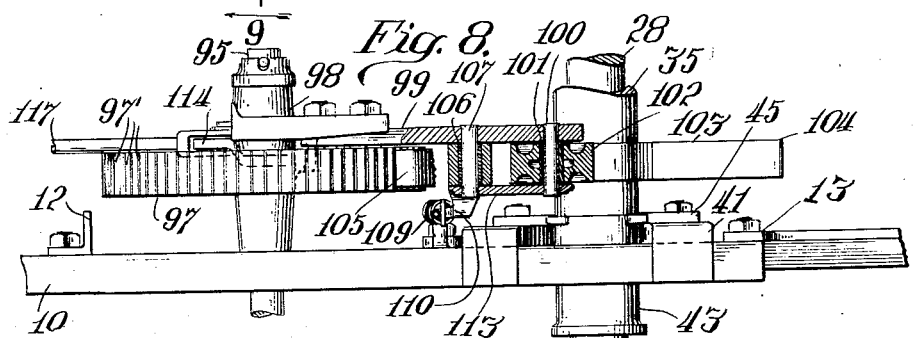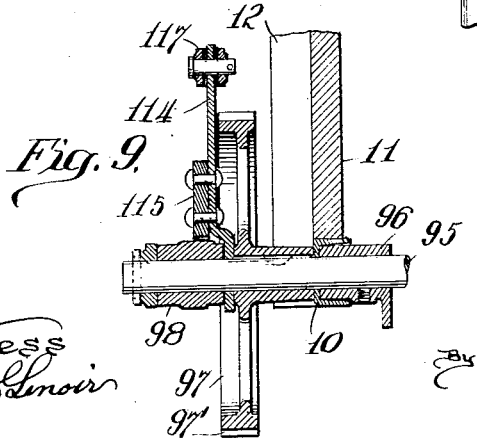

1,946,807

UNITED STATES PATENT OFFICE 1,946,807

MANURE SPREADER

Leonard B. Neighbour, Moline, Ill., assignor to Deere & Company, Moline, Ill., a corporation of Illinois Application October 11, 1926. Serial No. 140,711

28 Claims. (Cl. 74—221)

My invention relates to manure spreaders of the well-known type comprising a vehicle body mounted on front and rear wheels, a traction driven rear axle on which the rear wheels are mounted, and by the forward rotation of which it is driven, rotary beating and distributing apparatus mounted adjacent the rear end of the vehicle body, and a traveling conveyor, the upper course of which feeds the contents of the vehicle gradually rearwardly to the beating and distributing apparatus.

One of the features of my invention pertains generally to the means for driving the beating and distributing apparatus from the rear axle, and particularly to the means for establishing and interrupting this driving relation. In one representative embodiment of this type of spreader, the driving energy is obtained from a large driving sprocket, which rotates with the rear axle, this driving energy being transmitted to a looped driving chain which has operative connection with the beating and distributing apparatus. The upper end of this looped chain usually passes over an upper driven sprocket wheel which is mounted on the axis of one of the beater cylinders, and engaging in the lower end of the chain is an idler member, generally constructed as a sprocket wheel, which is movably supported whereby the chain can be shifted fore and aft to bring one side of the chain into or out of engagement with the driving sprocket to establish or interrupt the transmission of power.

It is with the manner of supporting and moving this idler sprocket that one of the features of the present invention is concerned. One of the objects of the invention is to support this idler sprocket for movement whereby it will serve the two-fold function of moving the drive chain into and out of engagement with the driving sprocket, and will also operate to keep the chain taut at all times. Further objects pertaining to this drive mechanism, are: to provide a movable support which will afford a staunch, firm mounting for the idler sprocket when the latter is in either of its operative positions, whereby to prevent play or whipping of the drive chain; to provide a movable support which will enable said sprocket to move in an arc substantially concentric of the upper driven sprocket; to provide supporting means which will exert a continuous spring tension on the idler sprocket for maintaining the driving chain taut at all times; and to so arrange this spring means that an increased spring tension will be applied to the chain in its non-driving position so as to prevent sagging or flopping of the chain at such times.

Another feature of my invention pertains to the mechanism for producing the intermittent feed of the conveyor which feeds the load toward the beating and distributing apparatus.

In this regard, one of the objects of the invention is to provide a construction wherein the ratchet wheel, the ratchet feed arm, and the feed adjusting means are concentrically mounted on a common axis. Another object is to dispose this common axis in advance of the rear axle and to impart feeding rotation to the ratchet wheel through a cam wheel mounted concentrically of and rotating with the rear axle.

Other objects of my invention pertaining to particular details of construction of my improved machine will be apparent from the following description of a preferred embodiment thereof. In the drawings illustrating this embodiment:

Fig. 1 is a side elevational view of the present manure spreader, showing that side of the machine on which the beater and distributor drive mechanism is disposed;

Fig. 2 is a fragmentary detail view, partly in section, showing the beater drive mechanism on a larger scale;

Fig. 3 is a detail sectional view taken approximately on the plane of the line 3—3 of Fig. 2;

Fig. 4 is a transverse sectional view through the entire machine, taken on the plane of the line 4—4 of Fig. 1;

Fig. 5 is a fragmentary detail view, illustrating the conveyor feed mechanism;

Fig. 6 is a sectional view taken approximately on the plane of the line 6—6 of Fig. 5;

Fig. 7 is a view similar to Fig. 5, showing the ratchet feed arm at the extreme limit of its power stroke;

Fig. 8 is a bottom plan view of the mechanism shown in Fig. 5, the free end of the ratchet feed arm being shown partly in section, and Fig. 9 is a detail sectional view taken on the plane of the line 9—9 of Fig. 7.

In the structure illustrated, 10, 10 are sill members that are spaced apart and extend longitudinally of the machine, the sills forming the base for the load-carrying body and supporting its side walls 11, 11. The latter are formed of boards, and are held in upright position and fastened together by vertical angle members 12 and brace members 13, which are secured to the sills 10 and the sides 11, as best shown in Fig. 1.

The sides of the body are tied together at the top and further braced by an angle iron member 14, formed in the shape of an inverted U, the extremities 15 thereof projecting down along the exterior of the body and being secured thereto and to the upper portions of the rearmost angle members 12. The arch portion of the member 14 extends far enough above the side walls of the body to permit a heaped-upload of material carried in the body to pass thereunder. The material carried in the body is caused to travel gradually rearwardly therein, when the machine is in operation, by an endless conveyor or apron 16 of a well known type, which operates in the lower portion of the body and may, in some instances, form the bottom thereof. The conveyor is operated by mechanism that will hereinafter be described.

An angle iron member 17 is secured to the top rear portion of each side of the body, and extends back from the rearmost brace 13 and downwardly to support a rearward extension 18 of the upper part of the body and to form a support for a rotary spreading member 19 that will hereinafter be more specifically described.

The front portion of the body is supported upon an axle 20 upon the ends of which are suitably mounted dirigible wheels 21, (see Fig. 1). The laterally movable draft tongue 22 is connected with the axle and the body, and is arranged to have its lateral steering motion transmitted to the front wheels by linkage 23. A driver's seat 24 is secured to the forward portion of the body and 25 is a footboard for the driver's feet.

Traction drive wheels 26 and 27, which furnish the power for driving the spreader mechanism, are mounted upon a rear axle 28, which extends transversely through the rear portion of the load-carrying body, the latter being supported from said axle in a manner that will be presently described. Secured to the hub of each drive wheel is a ratchet plate 29, provided with internal teeth 30, (see Fig. 2), with which ratchet teeth dogs 31, actuated by springs 32, cooperate, so that either wheel will transmit power upon forward motion, but will be ineffective to transmit power upon backward motion. As shown in Fig. 4, the ratchet dogs for the wheel 26 are journaled upon pins 33, carried by a flange 34 of a sleeve 35, the latter preferably being secured to the axle 28 by a key 36. The ratchet dogs for the wheel 27 are journaled upon pins 37, carried by a flange 38 of a sleeve 39, the latter preferably being secured to the axle by a key 40. With the construction described, the axle 28 and the sleeves 35 and 39 are driven in unison, both wheels furnishing driving power on straightaway travel, and when a turn is being made the power being furnished by the wheel traveling through the larger arc, the other wheel at such time being permitted to idle by reason of the ratchet mechanism above described. While the axle 28 in the structure illustrated is arranged to rotate, it would not be a departure from the spirit of the invention to secure the axle against rotation and permit the sleeves 35 and 39 to turn on the axle, although the structure shown in the drawings is considered preferable.

The load-carrying body is supported from the rear axle by inverted U-shaped brackets 41 and 42, the lower ends of which are secured to the sill members 10, and the middle portions of which extend around bearing sleeves 43 and 44, respectively, mounted on the axle inwardly of the sleeves 35 and 39, (Fig. 4). The bearing sleeves 43 and 44 extend through suitable openings provided therefor in the side walls of the body, and are held against rotation by their engagement with the U-shaped brackets 41 and 42 and by transverse straps 45 that engage the flattened under sides of the bearing sleeves, these transversely extending straps being secured to and bracing the arms of the brackets 41 and 42.

Revolubly mounted on the rear axle between the bearing sleeves 43 and 44 and between the side walls of the body is a beating cylinder, sometimes referred to as a distributor, the function of which is to break up and distribute the manure as it is fed thereto by the conveyor 16. It comprises spaced heads or spiders 46 and 47 to which are secured longitudinally extending bars 48, provided with teeth 49, (see Fig. 4). Rollers 50, mounted on the axle within the hubs of the spiders, provide anti-friction bearings for the cylinder, and the latter is held from shifting longitudinally of the axle by collars 51 pinned to the axle.

The beating cylinder is rotated through the medium of a sprocket 52, situated at one side of the body, which sprocket is provided with a plurality of inwardly extending lugs 53 that project through an opening in the side of the body. As shown in Fig. 4, these lugs are secured to the spider 47 by bolts 54.

Disposed in advance of and above the aforesaid main beating cylinder is a supplemental cylinder or beater which engages with the top portions of the load mass and co-acts with the main beating cylinder to disintegrate and throw rearwardly the manure or other material comprising the load. This supplemental cylinder comprises a shaft 55, journaled in bearings 56 secured to the down-turned extremities 15 of the U-shaped member 14, the shaft having secured thereto spider heads 57 to which are fastened longitudinally extending bars 58 provided with radially projecting teeth 59. The shaft 55 has secured thereto, outside the vertical planes of the side walls of the body, a sleeve 60 on which is formed a sprocket 61 that is disposed in the same vertical plane as the sprocket 52, which drives the main beating cylinder.

As previously described, a rotary spreading device 19 is mounted at the rear of the spreader body and situated so that material thrown back by the aforesaid main and supplemental cylinders will fall thereupon and be scattered over a greater space laterally than the width of the machine. As shown in Fig. 2, this lateral thrower, or wide-spreading device, comprises a shaft 62, journaled in suitable bearings secured to the down-turned portion of the angle members 17, and carrying spreading surfaces 63 which spiral outwardly with opposite helical twists from the median longitudinal line of the spreader body. The shaft 62 is rotated by a sprocket 64 which is secured to its outer end and is disposed in the same plane with the sprockets 52 and 61, so that a drive chain 65 trained over the sprockets 52, 61 and 64 will simultaneously drive the main beating cylinder, the supplemental cylinder, and the spiral, wide-scattering device, all in timed relation, depending upon the relative sizes of the sprockets. A chain tightener 66 is adjustably fastened to the side of the body, as at 67, to take up slack in the drive chain 65 and prevent its flopping.

The beating and distributing mechanism previously described is operated by a main drive chain 68, which is movably supported so that it serves both as a power transmitter and as a power interrupter or clutch. This main drive chain is trained around a sprocket 69 secured to the sleeve 60 at a point outside of the sprocket 61, and the lower looped end or bight of the chain is supported by an idler member, preferably in the form of a sprocket 70, which is mounted so as to be shiftable to carry the chain 68 into or out of engagement with the teeth of a main drive sprocket 71. As shown in Fig. 4, this main drive sprocket is bolted to the flange 38 of the ratchet mechanism located at this side of the machine. The idler sprocket 70 is connected with the vehicle frame for swinging movement toward or from the driving sprocket, by means of a swinging support comprising a U-shaped member or yoke 72 and a U-shaped member 76, pivoted to the frame as hereinafter described. The idler 70 is mounted between the ends of the U-shaped member 72 and is journaled upon a bushing 73 that is supported by a pin 74, which extends through the ends of said member, the parts being held in position by a nut 75 that screws over a threaded portion of the pin 74 (see Fig. 3). The bushing 73 also serves as a spacer between the ends of the member 72. The other end of the U-shaped member 72 is mounted between the spaced ends of the second U-shaped member 76, being pivoted upon a pin 77 that extends through the open ends of this second U-shaped member. A spacing sleeve 78 is mounted on the pin 77 between the arms of the member 72, and the parts are held in position by a nut 79 that screws over a threaded portion of the pin 77. The closed end of the member 76 is pivotally mounted, at a point in advance of and below the axis of the driving wheel 71, upon a stud 80 having a base 81 that is secured to the sill 10 and to the side of the body, thus providing a substantial support for the idler 70, which prevents side play or whipping of the chain, and affords it a considerable range of movement toward and from the drive sprocket 71. This follows by reason of the elbow or hinge action that takes place in the support, it being noted that the two members 72 and 76 constitute the links or articulated sections of a jointed arm which permits the idler 70 to swing horizontally and vertically around the two pivot centers 77 and 80, and aids in controlling its position. Thus the idler is free to follow an arc approximately concentric with the driven sprocket 69, when moved to carry the chain into or out of operative position. The pivots of these parts are relatively long and are supported at both their ends.

The support for the idler sprocket is swung fore and aft about the stud 80 by means of a lever 82 pivoted at 83 upon the side wall of the vehicle body. Said lever is operatively connected with the pin 77 of the jointed member by a coupling rod 84, the front end of which is pivoted at 85 to the lever, the rear end of the rod being threaded to adjustably receive a bearing 86 that pivotally engages the pin 77, as best seen in Fig. 3. The bearing 86 is held on the pin 77 by a spring cotter 87, and a jam nut 88 on the coupling rod keeps it from accidentally turning in the bearing. The lever 82 carries the usual latch operated dog 89, adapted to engage a notched sector 90, secured to the spreader body, for holding the jointed arm 72, 76 in either of the positions shown in Fig. 2.

To keep the drive chain taut, particularly when it is in its inoperative position, I provide a contractile spring 91 that is secured at one end to the vehicle frame outside the loop of said chain, and at one side of the driving sprocket 71. This end of the spring, which in the illustrated construction is its lower end, is preferably fastened to a stud 92 carried by an extension of the base 81. The opposite end of said spring is connected with the idler member 70,—preferably by connecting it to the pin 74 of the member 72. As shown in Fig. 2, the location of the stud 92 with reference to the axis 55 of the driven sprocket is such that in swinging the chain 68 to its inoperative position, the idler 70 crosses a line intersecting the points 55 and 92, and as the upper end of the spring moves, with it, obviously, movement of the idler 70 away from such line in either direction increases its distance from the point 92, and increases the tension of the spring, so that the chain is held taut without the necessity of providing a second idler or sheave for that purpose. The jointed arm 72—76 provides for moving the idler 70 in the manner described.

It should be noted that the stud 92 is so located with reference to the stud 80 and the pin 74 that when the latter is shifted to the dotted line position shown in Fig. 2, the spring 91 will be extended to place the drive chain under considerably greater tension than when the parts are in the position shown in full lines in said figure. When the driving chain 68 is engaged with the sprocket 71, the driving force applied to the chain tends to keep it taut, and but little tension from the spring is required, but when the chain is in non-working position, the considerable length of unsupported chain between the upper sprocket 69 and the idler sprocket 70 may result in its sagging or whipping, especially when the machine is being moved over a rough road, unless sufficient tension from the spring 91 is applied to the chain at such time to keep it taut. By providing additional spring tension for keeping the chain taut in its non-working position, assurance is had that it will be held clear of the main drive sprocket, thus avoiding possibility of damage to the chain or the teeth of the drive sprocket by accidental engagement of the parts when the machine is being driven to or from the field.

As previously stated, the material within the body is moved rearwardly and into the path of the teeth of the beating cylinders by the endless apron or conveyor 16. At the front of the load-carrying portion of the body, the apron is trained around and supported by sprockets 93, (Fig. 1) while at the rear of the body the apron is trained around and driven by sprockets 94 fastened on a shaft 95 supported in bearing 96 secured to the sills of the body. The means for rotating the shaft 95 by power from the axle 28 to move the apron rearwardly will now be described, reference being had to Figs. 5 to 9 inclusive. Secured to the shaft 95 at the side of the body is a wheel 97 having ratchet teeth 97' on its periphery. Pivoted upon the shaft 95 and disposed outside of the wheel 97 is a sleeve 98 to which is secured an arm 99 provided at its outer end with a stud 100 having a bushing 101 upon which is journaled a roller 102. The sleeve 35, keyed to the rear axle, is provided with a web 103, the periphery of which is an irregular shape to form a series of cams 104, which are adapted successively to engage the roller 102 as the axle 28 turns. Assuming that the roller 102 is in engagement with one of the cams 104 at the base thereof, as shown in Fig. 5, the counterclockwise rotation of the sleeve and cams will press the arm 99 downward, the roller traveling along the face of the cam 104. A dog 105 which is pivoted upon a bushing 106 mounted upon a stud 107 carried by the arm 99, and which is pressed against the teeth of the wheel by a spring 108, will cause the wheel to rotate with the arm during its downward movement and, consequently, drive the shaft 95 and move the apron rearwardly of the body. When the roller travels off the end of the cam 104 the arm 99 is caused to swing upwardly into position to be engaged by the next succeeding cam by a spring 109, one end of which is suitably secured to the arm 99, as by a hook 110, and the other end of which is connected with a bracket 111 fastened to the side of the body. It is of course understood that during the upward or return swing of the arm, the dog 105 will ratchet over the teeth of the wheel 97. During such return movement of the arm 99, the wheel is held against reverse movement by spring-pressed dogs 112 secured to the side of the body, and adapted to engage the ratchet teeth 97'. A plate 113 connects the ends of the studs 100 and 107 (Fig. 8), serving to tie them together.

The amount of movement imparted to the wheel 97 upon each downward movement of the arm 99, and consequently the extent to which the apron 16 is moved toward the distributing mechanism, is governed by an adjustable feed control arm 114, which is pivoted on the shaft 95 between the wheel 97 and the sleeve 98 (Fig. 9), and has secured to it a shoulder 115 that is adapted to engage with an abutment 116 formed on the sleeve 98 to limit the upward swing of the arm 99.

It will be seen that if the feed control arm 114 is shifted in a clockwise direction from the position shown in Fig. 7, the upward movement of the arm 99 will be limited by the abutment 116 engaging the shoulder 115, and the roller 102 will not rise to the point where it will be engaged by the bottom of the cams 104. Hence for this setting of the feed control arm the arm 99 will not be given a full stroke. By adjusting the position of the feed control arm, any desired feed less than the maximum may be obtained for the apron. When it is desired to discontinue the application of power to the feed mechanism that moves the apron, it is only necessary to shift the feed control arm 114 to the position shown in dotted lines in Fig. 7, at which point the arm 99 is held in a position where the roller 102 is entirely out of the path of the cams 104. An operating rod 117 is pivotally connected with the free end of the feed control arm and extends forwardly to a point within convenient reach of the driver where it may be connected with any suitable actuating means, such as a lever and notched sector (not shown) for holding it in any one of several positions.

It will be noted that by pivoting the ratchet feeding arm 99 and the feed regulating arm 114 on the same axis as the ratchet wheel 97, a very simple and compact construction is obtained. By placing this mechanism on the conveyor shaft 95, in front of the rear axle, the load weight thereof is well distributed on the wheels of the vehicle, and the feeding stroke of the feeding arm 99 is downward, which is also desirable.

While I prefer to embody my invention as specifically illustrated and described herein, I wish it to be understood that it is not limited to such specific construction, except in so far as claims may be directed thereto, as it will be apparent that various changes and modifications of such structure may be made without departing from the invention pointed out in the generic claims.

What I claim as my invention and desire to secure by Letters Patent, is—

1. In a beater drive mechanism for manure spreaders of the type comprising a driving sprocket wheel, a driven sprocket wheel operatively connected with the beater, and an endless drive chain traveling over said driven wheel and arranged to swing into and out of engagement with said driving wheel, the combination of means for keeping said drive chain taut and for moving it into and out of operative engagement with said driving wheel, comprising an idler member engaging the bight of said drive chain and swinging therewith, a spring connected at one end with said idler member, and at the other end with the spreader frame, and swinging means mounted on the spreader frame to swing toward or from the driving wheel and operatively connected with said idler member, said swinging means being arranged to move said idler member further from the point of connection of said spring with said frame when said chain is swung to its inoperative position by said idler, to increase the tension of said spring.

2. In a beater drive mechanism for manure spreaders of the type comprising a driving sprocket wheel, a driven sprocket wheel operatively connected with the beater, and an endless drive chain traveling over said driven wheel and arranged to swing into and out of engagement with said driving wheel, the combination of means for keeping said drive chain taut and for moving it into and out of operative engagement with said driving wheel, comprising an idler member engaging the bight of said drive chain and swinging therewith, a spring connected at one end with said idler member, and at the other end with the spreader frame, and manually actuated swinging means mounted on the spreader frame to swing toward or from the driving wheel and carrying said idler member, said swinging means being arranged to move said idler member further from the point of connection of said spring with said frame when said chain is swung either to its operative or to its inoperative position, to increase the tension of said spring.

3. In a beater drive mechanism for manure spreaders of the type comprising a driving sprocket wheel, a driven sprocket wheel operatively connected with the beater, and an endless drive chain traveling over said driven wheel and arranged to swing into and out of engagement with said driving wheel, the combination of means for keeping said drive chain taut and for moving it into and out of operative engagement with said driving wheel, comprising an idler member engaging the bight of said drive chain and swinging therewith, a spring connected at one end with said idler member, and at the other end with the spreader frame, and manually actuated swinging means mounted on the spreader frame outside the loop of said chain, to swing toward or from the driving wheel, and operatively connected with said idler member, said swinging means being arranged to move said idler member further from the point of connection of said spring with said frame when said chain is swung to its inoperative position, to increase the tension of said spring for exerting increased spring tension on the chain.

4. In a beater drive mechanism for manure spreaders of the type comprising a driving sprocket wheel, a driven sprocket wheel operatively connected with the beater, and an endless drive chain traveling over said driven wheel and arranged to swing into and out of engagement with said driving wheel, the combination of means for keeping said drive chain taut and for moving it into and out of operative engagement with said driving wheel, comprising an idler member engaging the bight of said drive chain and swinging therewith, a spring connected at one end with the said idler member, and at the other end with the spreader frame, and a jointed arm mounted on the spreader frame to swing toward or from the driving wheel and operatively connected with said idler member, said jointed arm being arranged to move said idler member further from the point of connection of said spring with said frame when said chain is swung to its inoperative position, to increase the tension of said spring for exerting increased tension on the chain.

5. In a beater drive mechanism for manure spreaders of the type comprising a driving sprocket wheel, a driven sprocket wheel operatively connected with the beater, and an endless drive chain traveling over said driven wheel and arranged to swing into and out of engagement with said driving wheel, the combination of means for keeping said drive chain taut and for moving it into and out of operative engagement with said driving wheel, comprising an idler member engaging the bight of said drive chain and swinging therewith, a spring connected at one end with said idler member, and at the other end with the spreader frame, and a jointed arm mounted on the spreader frame to swing toward or from the driving wheel and operatively connected with said idler member to swing the latter through a neutral position within the limits of its movement wherein the idler is disposed nearest to the point of connection of the spring with said frame, said jointed arm being arranged to move said idler member to either side of said neutral position and farther away from the point of connection of said spring with said frame when said chain is swung either to its operative or to its inoperative position, to increase the tension of said spring.

6. In a beater drive mechanism for manure spreaders of the type comprising a driving sprocket wheel, a driven sprocket wheel operatively connected with the beater, and an endless drive chain traveling over said driven wheel and arranged to swing into and out of engagement with said driving wheel, the combination of means for keeping said drive chain taut and for moving it into and out of operative engagement with said driving wheel, comprising an idler member engaging the bight of said drive chain and swinging therewith, a spring connected at one end with said idler member, and at the other end with the spreader frame, and a jointed arm mounted on the spreader frame, outside the loop of said chain, to swing toward or from the driving wheel and operatively connected with said idler member, said jointed arm being arranged to move said idler member further from the point of connection of said spring with said frame when said chain is swung to its inoperative position by said idler, to increase the tension of said spring.

7. In a beater drive mechanism for manure spreaders of the type comprising a driving sprocket wheel, a driven sprocket wheel operatively connected with the beater, and an endless drive chain traveling over said driven wheel and arranged to swing into and out of engagement with said driving wheel, the combination of means for keeping said drive chain taut and for moving it into and out of operative engagement with said driving wheel, comprising an idler member engaging the bight of said drive chain and swinging therewith, a contractile spring connected at one end with the spreader frame at one side of said driving wheel, and at the other end with said idler member, said idler member being arranged to swing from one side of a line intersecting the axis of said driven wheel and the point of connection of said spring with the frame to the other side of said line, in the movement of said chain from its operative to its inoperative position, and manually actuated means mounted on the spreader frame and connected with said idler member to so move said chain.

8. In a beater drive mechanism for manure spreaders of the type comprising a driving sprocket wheel, a driven sprocket wheel operatively connected with the beater, and an endless drive chain traveling over said driven wheel and arranged to swing into and out of engagement with said driving wheel, the combination of means for keeping said drive chain taut and for moving it into and out of operative engagement with said driving wheel, comprising an idler member engaging the bight of said drive chain and swinging therewith, a contractile spring connected at one end with the spreader frame at one side of said driving wheel, and at the other end with said idler member, said idler member being arranged to swing across a line intersecting the axis of said driven wheel and the point of connection of said spring with the frame, in the movement of said chain from its operative to its inoperative position, or vice versa, and means mounted on the spreader frame for actuating said idler member to so move said chain.

9. In a beater drive mechanism for manure spreaders of the type comprising a driving sprocket wheel, a driven sprocket wheel operatively connected with the beater, and an endless drive chain traveling over said driven wheel and arranged to swing into and out of engagement with said driving wheel, the combination of means for keeping said drive chain taut and for moving it into and out of operative engagement with said driving wheel, comprising an idler member engaging the bight of said drive chain and swinging therewith, a contractile spring connected at one end with the spreader frame at one side of said driving wheel, and at the other end with said idler member, said idler member being arranged to swing from one side to the other of a line intersecting the axis of said driven wheel and the point of connection of said spring with the frame, in the movement of said chain from its operative to its inoperative position, and manually actuated swinging means mounted on the spreader frame to swing toward or from the driving wheel, and connected with said idler member, for swinging said chain into or out of operative engagement with said driving wheel.

10. In a beater drive mechanism for manure spreaders of the type comprising a driving sprocket wheel, a driven sprocket wheel operatively connected with the beater, and an endless drive chain traveling over said driven wheel and arranged to swing into and out of engagement with said driving wheel, the combination of means for keeping said drive chain taut and for moving it into and out of operative engagement with said driving wheel, comprising an idler member engaging the bight of said drive chain and swinging therewith, a contractile spring connected at one end with the spreader frame at one side of said driving wheel, and at the other end with said idler member, said idler member being arranged to swing across a line intersecting the axis of said driven wheel and the point of connection of said spring with the frame, in the movement of said chain from its operative to its inoperative position, or vice versa, and manually actuated swinging means mounted on the spreader frame to swing toward or from the driving wheel, and connected with said idler member, for swinging said chain into or out of operative engagement with said driving wheel.

11. In a beater drive mechanism for manure spreaders of the type comprising a driving sprocket wheel, a driven sprocket wheel operatively connected with the beater, and an endless drive chain traveling over said driven wheel and arranged to swing into and out of engagement with said driving wheel, the combination of means for keeping said drive chain taut and for moving it into and out of operative engagement with said driving wheel, comprising an idler member engaging the bight of said drive chain and swinging therewith, a contractile spring connected at one end with the spreader frame at one side of said driving wheel, and at the other end with said idler member, said idler member being arranged to swing from one side to the other of a line intersecting the axis of said driven wheel and the point of connection of said spring with the frame, in the movement of said chain from its operative to its inoperative position for increasing the spring tension exerted on said chain when the latter is in its operative position, and a jointed arm mounted on the spreader frame to swing toward or from the driving wheel, and connected with said idler member, for swinging said chain into or out of operative engagement with said driving wheel.

12. In a beater drive mechanism for manure spreaders of the type comprising a driving sprocket wheel, a driven sprocket wheel operatively connected with the beater, and an endless drive chain traveling over said driven wheel and arranged to swing into and out of engagement with said driving wheel, the combination of means for keeping said drive chain taut and for moving it into and out of operative engagement with said driving wheel, comprising an idler member engaging the bight of said drive chain and swinging therewith, a contractile spring connected at one end with the spreader frame at one side of said driving wheel, and at the other end with said idler member, said idler member being arranged to swing across a line intersecting the axis of said driven wheel and the point of connection of said spring with the frame, in the movement of said chain from its operative to its inoperative position, or vice versa, and a manually actuated jointed arm mounted on the spreader frame to swing toward or from the driving wheel, and connected with said idler member, for swinging said chain into or out of operative engagement with said driving wheel.

13. In a beater drive mechanism for manure spreaders of the type comprising a driving sprocket wheel, a driven sprocket wheel operatively connected with the beater, and an endless drive chain traveling over said driven wheel and arranged to swing into and out of engagement with said driving wheel, the combination of means for keeping said drive chain taut and for moving it into and out of operative engagement with said driving wheel, comprising an idler member engaging the bight of said driving chain, said chain extending in a substantially vertical loop with its lower end swinging approximately horizontally about said driven sprocket wheel, a supporting member for said idler member, a contractile spring connected at one end with said supporting member, and at the other end with the spreader frame at a point outside the loop of said chain, and manually actuated means operable to swing said idler member toward or from the driving wheel.

14. In a beater drive mechanism for manure spreaders of the type comprising a driving sprocket wheel, a driven sprocket wheel operatively connected with the beater, and an endless drive chain traveling over said driven wheel and arranged to swing into and out of engagement with said driving wheel, the combination of means for keeping said drive chain taut and for moving it into and out of operative engagement with said driving wheel, comprising an idler member engaging the bight of said driving chain and swinging therewith, a movable supporting member for said idler member, a contractile spring connected at one end with said supporting member, and at the other end with the spreader frame at a point outside the loop of said chain, and manually actuated means mounted on said spreader frame and operable to swing said idler member toward or from the driving wheel, and operating to increase the tension of said spring as the idler member reaches its inoperative position to thereby increase the spring tension exerted on said chain.

15. In a beater drive mechanism for manure spreaders of the type comprising a driving sprocket wheel, a driven sprocket wheel operatively connected with the beater, and an endless drive chain traveling over said driven wheel and arranged to swing into and out of engagement with said driving wheel, the combination of means for keeping said drive chain taut and for moving it into and out of operative engagement with said driving wheel, comprising an idler member engaging the bight of said driving chain, said chain extending in a substantially vertical loop solely between said driven sprocket wheel and said idler member with its lower end swinging approximately horizontally about said driven sprocket wheel, a contractile spring connected at one end with said idler member, and at the other end with the spreader frame at a point outside the loop of said chain, and means mounted on said spreader frame and operable to swing said idler member toward or from the driving wheel, and operating to increase the tension of said spring as the idler member reaches either its operative or its inoperative position to thereby increase the spring tension exerted on said chain.

16. In a beater drive mechanism for manure spreaders of the type comprising a driving sprocket wheel, a driven sprocket wheel operatively connected with the beater, and an endless drive chain traveling over said driven wheel and arranged to swing into and out of engagement with said driving wheel, the combination of means for keeping said drive chain taut and for moving it into and out of operative engagement with said driving wheel, comprising an idler member engaging the bight of said drive chain, said chain extending in a substantially vertical loop solely between said driven sprocket wheel and said idler member with its lower end swinging approximately horizontally about said driven sprocket wheel, a support for said idler member, a contractile spring connected at one end with said support, and at the other end with the spreader frame at a point outside the loop of said chain, and a manually actuated swinging member mounted on the spreader frame at one side of the driving wheel and operable to swing said idler member toward or from the latter wheel.

17. In a beater drive mechanism for manure spreaders of the type comprising a driving sprocket wheel, a driven sprocket wheel operatively connected with the beater, and an endless drive chain traveling over said driven wheel and arranged to swing into and out of engagement with said driving wheel, the combination of means for keeping said drive chain taut and for moving it into and out of operative engagement with said driving wheel, comprising an idler member engaging the bight of said drive chain, said chain extending in a substantially vertical loop with its lower end swinging approximately horizontally about said driven sprocket wheel, a jointed arm mounted on the spreader frame at one side of the driving wheel and operable to swing said idler member and endless chain toward or from the latter wheel, and a contractile spring connected at one end with said jointed arm and at the other end with the vehicle frame at a point outside the loop of said chain.

18. In a beater drive mechanism for manure spreaders of the type comprising a driving sprocket wheel, a driven sprocket wheel operatively connected with the beater, and an endless drive chain traveling over said driven wheel and arranged to swing into and out of engagement with said driving wheel, the combination of means for keeping said drive chain taut and for moving it into and out of operative engagement with said driving wheel, comprising an idler member engaging the bight of said drive chain, said chain extending in a substantially vertical loop solely between said driven sprocket wheel and said idler member with its lower end swinging approximately horizontally about said driven sprocket wheel, a spring connected at one end with said idler member, and at the other end with the spreader frame, swinging means mounted on the spreader frame to swing toward or from the driving wheel and operatively connected with said idler member, said swinging means being arranged to move said idler member further from the point of connection of said spring with said frame when said chain is swung to its inoperative position, to increase the tension of said spring and thereby increase the tension exerted on said chain, a lever operable to swing said swinging means, and locking means for said lever.

19. In a beater drive mechanism for manure spreaders of the type comprising a driving sprocket wheel, a driven sprocket wheel operatively connected with the beater, and an endless drive chain traveling over said driven wheel and arranged to swing into and out of engagement with said driving wheel, the combination of means for keeping said drive chain taut and for moving it into and out of operative engagement with said driving wheel, comprising an idler member engaging the bight of said drive chain, said chain extending in a substantially vertical loop with its lower end swinging approximately horizontally about said driven sprocket wheel, a supporting member for said idler member, a contractile spring connected at one end with said supporting member, and at the other end with the spreader frame at a point below the lower end of said chain, swinging means mounted on the spreader frame to swing toward or from the driving wheel and connected with said idler supporting member, for swinging said chain by means of said idler into or out of operative engagement with said driving wheel, a lever operable to swing said swinging means, and locking devices for said lever.

20. In a beater drive mechanism for manure spreaders of the type comprising a vehicle body, a driving sprocket wheel, a driven sprocket wheel operatively connected with the beater, and a chain traveling over said driven sprocket, the combination of an idler sprocket engaging with said chain, said chain extending in a substantially vertical loop solely between said driven sprocket wheel and said idler sprocket with its lower end swinging approximately horizontally about said driven sprocket wheel, supporting means for said idler sprocket comprising a jointed arm pivotally mounted on the body outside of said chain and in advance of and below the axis of said driving sprocket, means connected with said jointed arm and operable to shift the latter fore and aft to move said idler sprocket in an arc about said driven wheel, causing said chain to swing out of and into driving engagement with said driving sprocket, and a spring having connection with said jointed arm, operative to exert a variable chain tightening tension on said idler sprocket as the latter is moved fore and aft.

21. In a beater drive mechanism for manure spreaders of the type comprising a vehicle body, a driving sprocket wheel, a driven sprocket wheel operatively connected with the beater, and a looped chain trained at its upper end over said driven sprocket, the combination of an idler sprocket engaging in the lower end of said looped chain, said chain extending in a substantially vertical loop with its lower portion swinging concentrically about said driven sprocket wheel for moving into and out of engagement with the front side of said driving sprocket wheel, a pivot bracket secured to said body, a first U-shaped member pivotally supported on said bracket, a second U-shaped member pivotally connected to the swinging end of said first U-shaped member, said idler sprocket being pivotally supported between the sides of said second U-shaped member, a spring connected to said second U-shaped member for exerting a chain tightening tension through said idler sprocket, and an operating member connected to one of said U-shaped members for shifting said idler sprocket to move said chain into and out of engagement with said driving sprocket.

22. In a beater drive mechanism for manure spreaders of the type comprising a vehicle body, a driving sprocket wheel, a driven sprocket wheel operatively connected with the beater, and a looped chain trained at its upper end over said driven sprocket, the combination of an idler sprocket engaging in the lower end of said looped chain, said chain extending in a substantially vertical loop solely between said driven sprocket wheel and said idler sprocket and adapted to swing into and out of engagement with the front side of said driving sprocket wheel, a pivot bracket secured to said body, a first U-shaped member pivotally supported on said bracket, a second U-shaped member pivotally connected to the swinging end of said first U-shaped member, said idler sprocket being pivotally supported between the sides of said second U-shaped member, a contractile spring connected at one end with said pivot bracket and at its other end to said second U-shaped member for exerting a chain tightening tension through said idler sprocket, and an operating member connected to the pivotal connection between said U-shaped members, for shifting said idler sprocket to move said chain into and out of engagement with said driving sprocket.

23. In a beater drive mechanism for manure spreaders of the type comprising a driving sprocket wheel and a rotatable beater, the combination of a driven sprocket wheel mounted on the axis of said rotatable beater and disposed above and forwardly of the vertical axial plane of said driving sprocket wheel, a chain passing around said driven sprocket wheel and having both sides extending downwardly substantially vertically therefrom, an idler sprocket wheel engaging in the bottom of the chain loop and adapted to swing one side of the loop rearwardly into engagement with the front side of said driving sprocket wheel, a jointed arm comprising a first arm section pivotally mounted on the spreader frame forwardly of said chain loop and a second arm section pivotally mounted on said first arm section and extending rearwardly therefrom, said idler sprocket wheel being mounted on said second arm section, a spring connected between said second arm section and the spreader frame for exerting downward spring tension on said idler sprocket wheel, and manually actuated shifting means connected with said jointed arm for swinging the same fore and aft.

24. In a beater drive mechanism for manure spreaders of the type comprising a main beater mounted on the axle of the supporting wheels, a driving sprocket wheel concentric therewith, and a secondary rotatable beater, the combination of a driven sprocket wheel mounted on the axis of said secondary rotatable beater and disposed above and forwardly of the vertical axial plane of said driving sprocket wheel, a chain passing around said driven sprocket wheel and having both sides extending downwardly substantially vertically therefrom, an idler sprocket wheel engaging in the bottom of the chain loop and adapted to swing one side of the loop rearwardly into engagement with the front side of said driving sprocket wheel, a jointed arm comprising a first arm section pivotally mounted on the spreader frame forwardly of said chain loop and a second arm section pivotally mounted on said first arm section and extending rearwardly therefrom, said idler sprocket wheel being mounted on said second arm section, a spring connected between said second arm section and the spreader frame for exerting downward spring tension on said idler sprocket wheel, manually actuated shifting means connected with said jointed arm for swinging the same fore and aft and a separate chain for driving said main beater from said secondary beater.

25. In a beater drive mechanism for manure spreaders of the type comprising a driving sprocket wheel, a driven sprocket wheel operatively connected with the beater, and an endless chain extending substantially vertically from said driven wheel and arranged to swing into and out of tangential operative engagement with said driving wheel, the combination of an idler member engaging the bight of said driving chain, idler supporting means comprising pivotally joined arms mounted on said spreader frame, one of said arms being under spring tension for keeping said chain taut, said chain being moved into and out of tangential engagement with said driving wheel by means of said idler moving in an arc about a fixed point, and manually actuated means connected with said idler supporting means for actuating said idler.

26. In a beater drive mechanism for manure spreaders of the type comprising a driving sprocket wheel, a driven sprocket wheel operatively connected with the beater, and an endless drive chain traveling over said driven wheel and arranged to swing into and out of engagement with said driving wheel, the combination of means for keeping said drive chain taut and for moving it into and out of operative engagement with said driving wheel, comprising an idler member engaging the bight of said drive chain, a support for said idler member, resilient means connected between said support and the spreader, a swinging member on the spreader to which said support is pivoted, said swinging member and support defining an obtuse angle between them when the chain is in engagement with said driving wheel, and means connected to one end of the support for moving said swinging member in a direction to decrease said angle and move said support substantially lineally to actuate the idler continuously outwardly away from the driving wheel.

27. In a beater drive mechanism for manure spreaders of the type comprising a driving sprocket wheel, a driven sprocket wheel operatively connected with the beater, and an endless drive chain traveling over said driven wheel and arranged to swing into and out of engagement with said driving wheel, the combination of means for keeping said drive chain taut and for moving it into and out of operative engagement with said driving wheel, comprising an idler member engaging the bight of said drive chain, and swinging means connected between said idler member and said spreader comprising a support for said idler member extending substantially radially to said driving sprocket wheel, a swinging member on the spreader to which said support is pivoted, resilient means connected between said support and the spreader, and manually actuated shifting means connected at the pivotal point between said support and said swinging member to move the support endwise substantially radially of the driving sprocket wheel to actuate said idler directly toward or directly away from said latter wheel.

28. In a beater drive mechanism for manure spreaders of the type comprising a driving sprocket wheel, a driven sprocket wheel operatively connected with the beater, and an endless drive chain traveling over said driven wheel and arranged to swing into and out of engagement with said driving wheel, the combination of means for keeping said drive chain taut and for moving it into and out of operative engagement with said driving wheel, comprising an idler member engaging the bight of said drive chain, a support for said idler member, a swinging member on the spreader to which said support is pivoted, said latter member and support defining an obtuse angle between them when the chain is in engagement with said driving wheel, and means for swinging said member in a direction to decrease said angle and move said support substantially parallel to itself to move the idler away from the driving wheel.

LEONARD B. NEIGHBOUR.